United States Patent [19]

Chao

[11] Patent Number: 5,122,918
[45] Date of Patent: Jun. 16, 1992

[54] DUST FREE PROTECTIVE DEVICE FOR DISK DRIVE

[76] Inventor: Lee M. Chao, 21 Barmore Dr., Stamford, Conn. 06905

[21] Appl. No.: 573,728

[22] Filed: Aug. 28, 1990

[51] Int. Cl.5 .................... G11B 23/03; G11B 23/02; G11B 1/00
[52] U.S. Cl. ................... 360/133; 360/97.01; 360/137; 369/12; 312/1; 312/10; 70/158; 206/444
[58] Field of Search .......... 360/133, 137, 97.01–97.04; 369/12; 312/1, 10; 70/14, 158; 455/347, 348; 335/845; 206/444, 312

[56] References Cited

U.S. PATENT DOCUMENTS

| | | | |
|---|---|---|---|
| 4,112,471 | 9/1978 | Pollard et al. | 360/133 |
| 4,481,552 | 11/1984 | Dona et al. | 360/97.02 |
| 4,587,645 | 5/1986 | Wong et al. | 360/97.03 |
| 4,607,301 | 8/1986 | Iizuka | 360/137 |
| 4,691,257 | 9/1987 | Taguchi | 360/97.02 |
| 4,698,707 | 10/1987 | Heys, Jr. et al. | 360/97.02 |
| 4,710,830 | 12/1987 | Imai et al. | 360/97.03 |
| 4,907,111 | 3/1990 | Derman | 360/97.02 |
| 4,980,785 | 12/1990 | Talmadge | 360/97.02 |

FOREIGN PATENT DOCUMENTS 59-63001  4/1984  Japan ................... 360/97.02

*Primary Examiner*—Aristotelis Psitos
*Assistant Examiner*—Alfonso Garcia

[57] ABSTRACT

An air filtrating disk drive slot dust protector comprises an air filtrating element attached to the front portion of a disk shaped supporting body, so that insertion of the protector into the disk drive causes the disk drive slot to be blocked by the air filtrating element, thereby keeping the dust from entering the disk drive slot but still allowing the cooling air to pass.

4 Claims, 1 Drawing Sheet

DUST FREE PROTECTIVE DEVICE FOR DISK DRIVE

BACKGROUND

Removable magnetic disk has been widely used in computer systems as data storage. The disk can be inserted and removed through the disk inserting slot on the disk drive.

Fans are often used to move the cooling air cross the electronics devices in the disk drive and other components of the computer system to disperse the heat they generated. Usually the cooling air enters from the front and exhausts to the back of the enclosure of the computer system. Majority of the commercially available personal computers move the cooling air in said direction. The disk inserting slot of the disk drive becomes an intake of the cooling air. The cooling air flows in the disk inserting slot and passes directly cross the electronic devices in the disk drive behind the slot, carries out the heat they generated. By virtue of fact that the electronic devices in the disk drive operate in lower temperature, the reliability improves. However dust suspended in the air also enters the disk drive through the disk inserting slot. The dust may settle and accumulate on the parts of the disk drive. The disk drive employs one or more optical interrupters to detect the proper insertion and operation of the disk. When the dust accumulates on the lens of the optical interrupters, it blocks and weakens the light passing through the lens. A medium accumulation may cause intermittent malfunction of the disk drive. A heavy accumulation results complete failure of the disk drive. The dust settled and accumulated on the magnetic read/write head of the disk may scratch the magnetic media coating of the disk or even the magnetic read/write head itself when the head pressed onto the surface of the rotating disk during read or write operation. The scratches on the disk make portion of the disk useless. If the scratches happen to be on the portion of the disk containing recorded data, the data recorded on the scratched part of the disk become non-retrievable. Very often it makes the whole data file useless. The loss of important data has been proven to be very costly to recover if not impossible. The scratches on the very delicate surface of the magnetic read/write head may cause permanently damage and require costly repair.

Some devices has been developed to prevent the dust from entering the disk drive.

A door like device is available commercially for covering the face of disk drive or even the entire disk panel of the computer system. It does prevent the dust from entering the disk drive by blocking the air from entering the disk inserting slot. But it also stops the useful cooling air flow from entering the disk inserting slot to disperse the heat generated by the electronic devices inside of the disk drive. The electronic devices may overheat as a result. The reliability of the disk drive sacrifices, and the overheat condition may even cause damage.

Some disk drive manufacturers provide a protective board for use during transportation of the disk drive to prevent magnetic read/write head from damage due to vibration, but it provides no protection against dust.

SUMMARY OF THE DISCLOSURE

It is an object of the present invention to provide a simple, inexpensive device which prevents the dust from entering the disk drive through the disk inserting slot. By using the device embodying the present invention, the disk inserting slot on the disk drive will be blocked by the air filtrating element of the device. Advantageously the dust is removed from the air flow entering the disk drive through the disk inserting slot, therefore greatly reduce the chance of damage to the disk or the disk drive by the accumulation of the dust. But the cooling air is still allowed to flow in through the disk inserting slot to disperse the heat generated by the electronic devices in the disk drive. The electronic devices in the disk drive operate cooler thus improving the reliablity.

When transporting the disk drive or the entire computer system with the disk drive, the installation of said device embodying the present invention also protects the magnetic read/write head from damage due to vibration.

In accordance with the present invention the protective device for removable magnetic disk drive comprising an air filtrating element mounted in front portion of a thin protective board which has the similar dimensions of the disk used in the disk drive. The said air filtrating element on the protective board has inherent elastic means to seal the disk inserting slot. The said protective board has a circular cut out at its center to keep it from jamming the disk driving axle inside of the disk drive and an optional bendable tab extended from its front edge for easy removal.

BRIEF DESCRIPTION OF THE DRAWINGS

The invention, together with further objects, aspects, advantages and features thereof will be more clearly understood from a considertion of the following description taken in conjunction with the accompanying drawings in which like elements will be bear the same reference designations throughout the various figures.

DESCRIPTION OF THE PREFERRED EMBODIMENT

Figure 1:
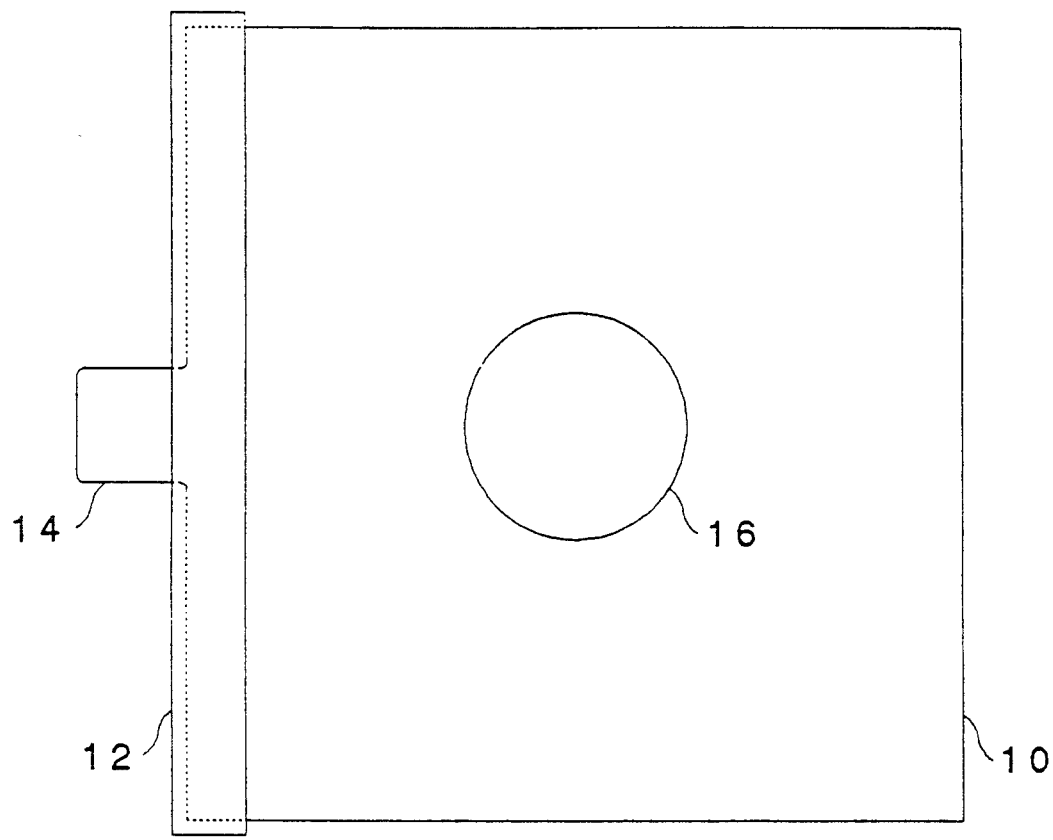
FIG. 1 is a plan view of the device constructed in accordance with the present invention.

Referring now to the drawings, a device constructed in accordance with the teaching of the present invention is illustrated. The device includes an air filtrating element 12 mounted on a protective board 10.

Figure 2:
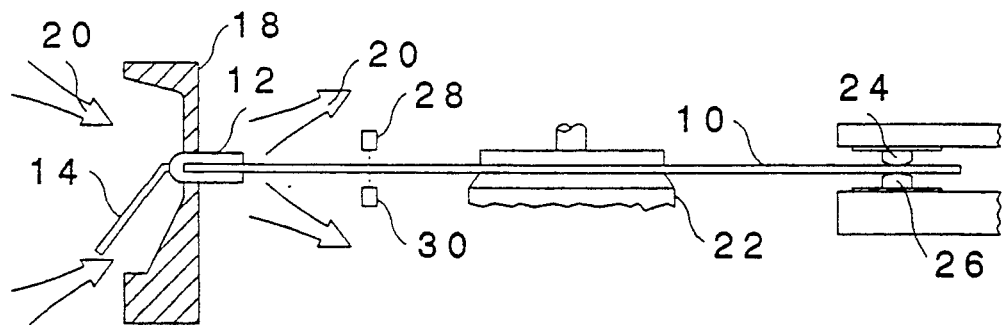
FIG. 2 is the side section view of the device constructed in accordance with the present invention installed in the disk drive with the disk driving axle and magnetic read/write heads exposed.

FIG. 2 illustrates the said device installed in a disk drive. The protective board 10 is made of sheet of semirigid material, preferably paper, or plastic. It has similar dimensions of the disk used in the disk drive being protected. For example, it may be 3.5 inches, 5.25 inches or 8 inches square, etc. It should be thin enough to leave more opening of the disk inserting slot to the air flow. At the center of the protective board there is a circular cut out 16. The diameter of the cut out 16 should be slightly larger than the diameter of the disk drive axle 22 of the disk drive to be protected. With the device installed, the disk driving axle 22 inside of the disk drive should be able to rotate freely without clipping onto the protective board 10 if the door or latch on the disk drive is closed to avoid jamming the disk driving axle 22 inside the drive. Such jamming may cause damage to the disk driving axle 22, disk driving motor or motor driving circuits. There is also an optional tab 14 extended from the front edge of the protective board 10 for easy removal of the device from the disk drive by hand. The tab can be bended up or down for convenience.

The air filtrating element 12 is mounted on the front portion of the protective board 10 on both side. The total thickness of the air filtrating element 12 should be slightly thicker than the height of the disk inserting slot on the disk drive. The preferred material to construct the air filtrating element should be a porous, elastic substance which does not release dust or lint from itself to the passing air. For example, it may be resin treated polyester fiber, paper, open cell form, etc. The air filtrating element 12 should have a wear resistant skin covering the area in contact with the side walls 18 of the disk inserting slot to reduce the wearing during insertion to and removal from the disk drive. It may also be treated with dust attracting agent to enhance its ability of trapping the dust with small size., When the device fully inserted into the disk drive, the air filtrating element 12 is in between the side walls 18 of the disk inserting slot and is under compression by them on both side. The stress due to the inherent elasticity of the material which the air filtrating element 12 is constructed continuously urges the body of the air filtrating element 12 to expand toward the side walls, filling the voids between the air filtrating element 12 and the side walls 18 of the disk inserting slot. The disk inserting slot therefore is completely blocked by the air filtrating element 12 as illustrated in FIG. 2. The cooling air 20 flowing into the disk drive through the disk inserting slot must pass through the air filtrating element 12. The dust suspended in the cooling air 20 will be blocked or trapped by the air filtrating element 12 as the cooling air passing through it. The device advantageously allows the dust-free cooling air 20 to enter the disk drive from the disk inserting slot and flow directly cross the electronic devices of the disk drive to maximize the cooling and minimize the potential damage caused by the accumulation of dust.

When the disk drive mounted horizontally, the protective board 10 covers the lower part of disk drive which includes some of the dust sensitive electronic components such as lower part 30 of the optical interrupter, magnetic read write head 26. The dust entered the disk drive through other part of the computer system would not be able to accumulate on the surfaces of those dust sensitive electronic components but on top surface of the protective board 10 which can be easily cleaned by removing the device from the disk drive. The working surfaces of the dust sensitive electronic components which the protective board 10 does not cover in upper part of the disk drive such as the upper part 28 of the optical interrupter, read/write head 24 are faced downward against the direction of the gravity force, therefore the dust is not likely to settle on them. Advantageously the device protects the disk drive from potential damage due to the dust entered disk drive through other part of the computer system.

During transportation of the disk drive, the protective board 10 of the installed device is sandwiched between the magnetic read/write heads 24 and 26 advantageously providing a cushion to prevent damage from the possible collision between them due to vibration.

Figure 3:
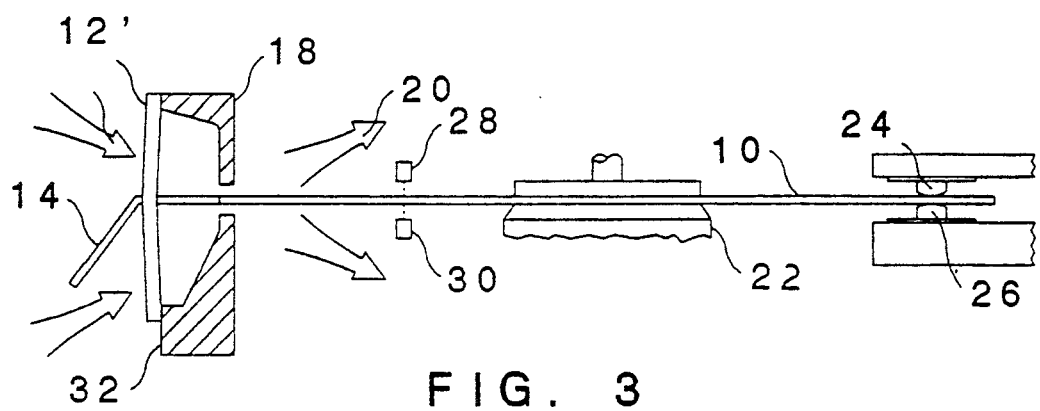
FIG. 3 is the side section view of the device constructed in accordance with the present invention with the air filtrating element mounted on an alternate position installed in the disk drive with the disk driving axle and magnetic read/write heads exposed.

FIG. 3 illustrates an alternative mounting position of the air filtrating element 12'. Here the air filtrating element 12' is mounted in an upright position on both side of protective board 10, with its nature position in an angle leaning toward the rear of the protective board 10. The height of the air filtrating element 12' is higher than the recessed portion of the front panel of disk drive which includes the disk inserting slot. When the device fully inserted into the disk drive, the protective board 10 is latched inside of the slot by the disk drive mechanism as it does to a normal disk. The front panel of the disk drive deflect the air filtrating element 12' on both side of the protective board 10 toward the front of the device. The stress generated by the inherent elasticity of the material which the air filtrating element 12' is constructed continuously urges the air filtrating element 12' to lean against the front panel 32 of the disk drive, closing any gap between them. Thus the air path to the disk inserting slot is completely blocked by the air filtrating element 12'. Advantageously it removes the dust suspended in the cooling air 20 passed through it, effectively preventing the damage to the disk drive by the accumulation of such dust inside of the disk drive.

Replacing the protective board 10 with a magnetic disk results in a disk which not only functions as a normal disk, but also protects the disk drive from dust damage when the disk drive is in operation. When used in conjunction with the device constructed with protective board, they provide complete dust protection to the disk drive.

Since other changes and modifications varied to fit particular disk drive will be understood by those skilled in the art the invention is not considered limited to the examples chosen for purposes of illustration and includes all changes and modifications which do not constitute a departure from the true spirit and scope of this invention as claimed in the following claims and equivalents thereto.

I claim:

1. A device for exchanging air from outside to inside of a disk through a disk drive slot in a dust free manner and preventing disk read/write head from damage by vibration comprising:

a substantially disk-shaped supporting body element to be inserted into a disk drive through a disk drive slot, said supporting body element having a rear edge, said supporting body element having a circular cut out at a center with a diameter larger than a diameter of a disk driving axle in said disk drive, and said supporting body element having a tab attached to said rear edge of an element to aid the insertion and removal of said element into and from said disk drive slot;

an elastic, porous, air filtrating, slot engaging element attached to the rear, edge of said supporting body element, said slot engaging element having a thickness substantially equal to a height of said disk drive slot, said slot engaging element having a width substantially equal to a width of said disk drive slot, said slot engaging element covering said supporting body element at least one side to a predetermined depth;

binding means to secure said slot engaging element to said supporting body element.

2. A device according to claim 1, wherein:

said substantially disk-shaped supporting body element is a standard jacketed magnetic disk.

3. A device according to claim 1, wherein: said slot engaging element comprising a porous, soft, elastic body, and a porous wear resistang skin covering part of said body.

4. A device according to claim 1, wherein:
the thickness of said slot engaging element is thicker than the height of said disk drive slot, and the width of said slot engaging element is wider than the width said disk drive slot.

* * * * *